Aug. 28, 1928.  1,682,684
C. S. PINKERTON
FUEL FLOW REGULATOR FOR CONSTANT HEAT
Filed Nov. 13, 1926
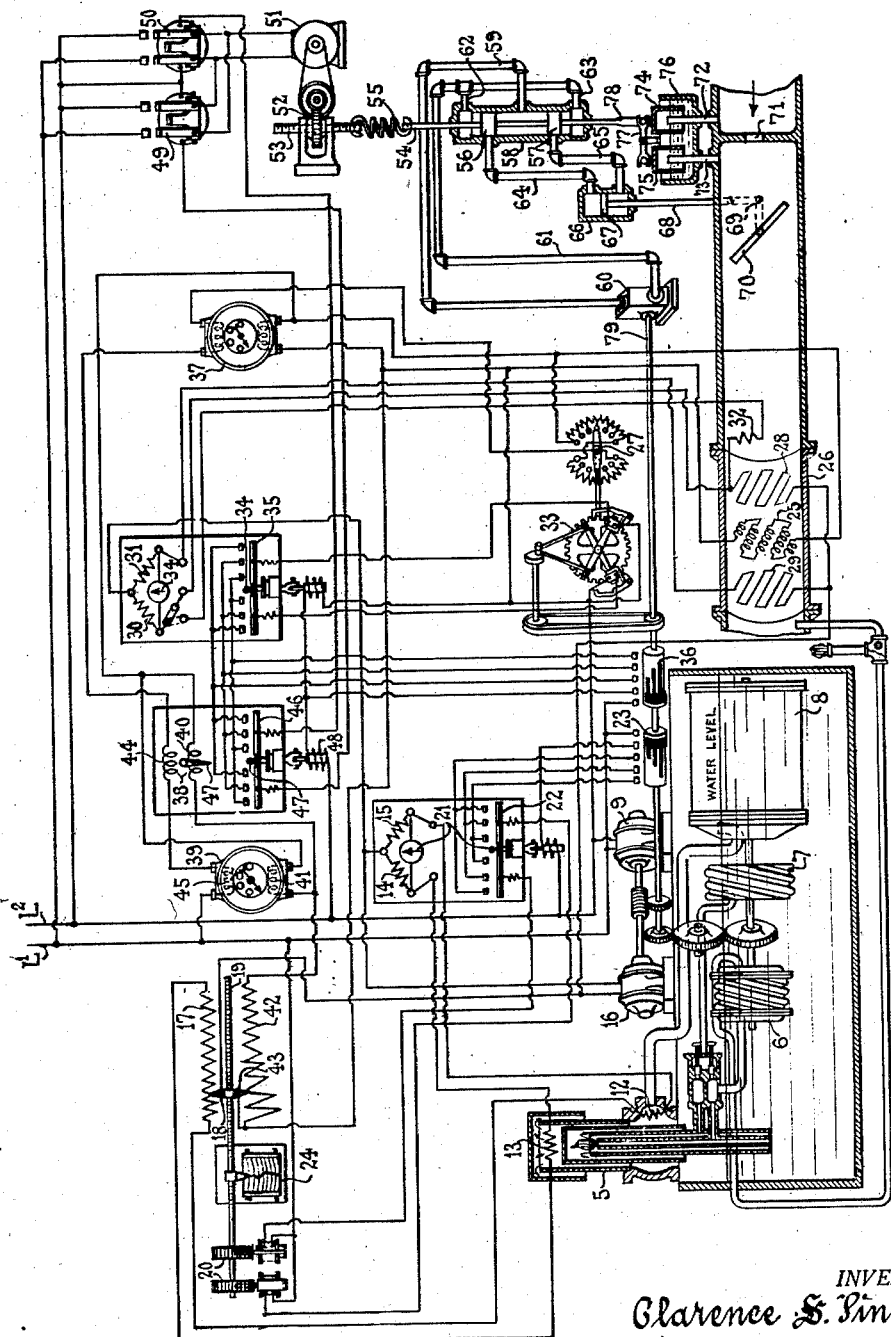
INVENTOR.
Clarence S. Pinkerton
BY
Frank M. Hubbard
ATTORNEY.

Patented Aug. 28, 1928.

1,682,684

UNITED STATES PATENT OFFICE.

CLARENCE S. PINKERTON, OF MILWAUKEE, WISCONSIN, ASSIGNOR TO THE CUTLER-HAMMER MFG. CO., OF MILWAUKEE, WISCONSIN, A CORPORATION OF WISCONSIN.

FUEL-FLOW REGULATOR FOR CONSTANT HEAT.

Application filed November 13, 1926. Serial No. 148,235.

This invention relates to improvements in apparatus for maintaining of substantially constant value the total available heat in a flow of combustible fluid.

In certain industrial installations, such as in the coking of coal, it is necessary or highly desirable to maintain a uniform supply of the heating medium, in the form of a flow of fuel gas, to the ovens. Heretofore attempts have been made to approximate this result by maintaining a constant gas pressure ahead of the gas burners. Such an arrangement might be satisfactory under conditions of constant barometric pressure, temperature, quality and specific gravity of the gas, stack draft, etc. It is found, however, that all of these conditions vary in an unrelated manner, resulting in the necessity for variations in pressure setting to maintain a constant supply of heat units to the ovens.

The employment of a known type of calorimeter and a so-called Thomas meter (as described in the patent to Packard, No. 1,482,091, dated Jan. 29, 1924) to measure the quality and quantity in "standard units" is of great assistance in manually resetting or adjusting the pressure regulator to maintain the proper flow of gas. Moreover, as set forth in said Packard patent, it is possible to combine and coordinate the calorimeter and meter in a manner to provide a "total heat meter", which is adapted to automatically calculate the product of the quality times the quantity of gas supplied, in standard units.

As hereinafter described, a clamping control instrumentality may be combined with the total heat meter to provide for automatically adjusting a pressure regulator to compensate for all of the aforementioned variations whereby a flow of fluid of substantially constant potential heating value is provided. Such a combination of elements operates satisfactorily with respect to variations which take place slowly, such as barometric changes, ordinary temperature changes, and quality changes of the gas.

However, the characteristics of a meter of the type aforementioned render it incapable of responding quickly to sudden changes, such as occur in the stack draft.

An object of the invention is to provide apparatus of the aforementioned character for maintaining of substantially constant value the total available heat of a flow of combustible fluid.

Another object is to provide apparatus of the character aforestated having means to automatically compensate for variations which would otherwise tend to affect the accuracy of operation thereof.

Another and more specific object is to provide a total heat controller wherein means are provided to substantially instantaneously compensate for variations in pressure of a flowing combustible fluid, whereby the total heating value of the flow per unit of time is maintained substantially constant.

Another object is to generally improve the operating characteristics of total heat controllers of the type aforementioned.

Other objects and advantages of the invention will hereinafter appear.

The accompanying drawing illustrates one embodiment of my invention which will now be described, it being understood that various changes may be made in the details of construction and operation of the device without departing from the spirit and scope of my invention as defined in the appended claims.

Following the disclosure of said Packard patent No. 1,482,091, I preferably employ a calorimeter of the character disclosed and claimed in the copending application of Packard, Serial No. 347,227, filed Dec. 24, 1919; although it is to be understood that any other form of calorimeter adapted to effect continuous determinations and also to effect automatic application of the same corrective factors with comparable degrees of accuracy may be substituted if desired.

The apparatus employed for ascertaining the quantitative rate of flow of the fluid comprises preferably a so-called Thomas meter substantially of the type disclosed in patent to Thomas No. 1,222,492 of April 10, 1917, as modified by the disclosure of patent to Wilson and Packard No. 1,261,086 of April 2, 1918, which type of meter lends itself readily to combination with a calorimeter for present purposes.

Referring to the drawing, the same illustrates a calorimeter of the character aforedescribed and comprising essentially a burner 5 to be supplied with test gas, combustion air and cooling fluid, also preferably comprising air, said test gas and cooling air being supplied in definitely and continuously proportioned quantities and under like conditions of temperature, pressure and saturation, as by means of synchronously driven wet displacement pumps 6 and 8 acting in conjunction with a common liquid seal as in the Packard application aforementioned.

Combustion air is also supplied to the burner under conditions such as to insure that the supply thereof be fully adequate or even ample for complete combustion of the test gas and be maintained of an order of magnitude comparable to that of the supply of the latter though not requiring definite or even approximate proportionality thereto. Such conditions of supply of combustion air may be attained in a convenient but needlessly precise manner by means of an additional pump 7 operating under the conditions aforedescribed.

Resistance thermometers 12 and 13 are arranged within the cooling fluid chamber of the burner in relations such as to be influenced by the temperature of the cooling fluid before and after absorption thereby of the total heat available through subjection of the test quantity of the fluid to the contemplated cycle, that is, in the present case, combustion of the test gas with the combustion air. Said resistance thermometers are connected to form in conjunction with fixed resistances 14 and 15 a Wheatstone bridge, the latter having certain connections providing for electrical energization thereof as from the direct current generator indicated at 16, the latter to be conveniently driven from the motor 9 as illustrated.

An additional step 17 of fixed resistance is included in circuit between the resistance thermometers 12 and 13, whereas connection of this side of the bridge with its supply circuit is effected at an intermediate and variable point of such fixed resistance as by means of a reciprocable slider 18, the latter being operable by means of a screw 19 which is in turn adapted to be actuated in opposite directions by a duplex ratcheting mechanism indicated generally at 20.

A galvanometer having a needle 21 is connected across the Wheatstone bridge as illustrated, said needle serving in conjuction with a clamping switch mechanism 22 and with a commutator device 23 to be driven at a reduced speed by motor 9 for controlling the operation of the ratcheting device 20, causing the latter to vary the position of the slider 18 and thereby adjust and restore the balance of the Wheatstone bridge following unbalance of the latter due to variation in heating quality of the fluid. The action of the aforedescribed parts is fully disclosed in the aforementioned Packard application, and since such specific features per se constitute no part of the present invention, further description thereof herein is deemed unnecessary, except to state that here, as in said Packard application, the calorimeter described is adapted to measure total available heat per unit quantity as distinguished from the net heating values determined by certain forms of calorimeters which are inadapted to effect certain corrections which inhere in the operation of the calorimeter aforedescribed. Further, the movement of the screw 19 may be employed here as in said Packard application, for effecting indication of either instantaneous or integrated values, or both, of the total available heat per unit quantity of the fluid, as by means of recorder 24 illustrated.

The fluid meter preferably employed herein comprises essentially an electric resistance heater 25 located within the main fluid conduit 26 and adapted to be supplied with current from lines $L^1 L^2$, the value of energization so supplied being regulable by means of the rheostat 27. Resistance thermometers 28 and 29 are arranged within conduit 26 for subjection respectively to the temperature of the fluid flowing therein before and after heating by the heater 25. Said resistance thermometers are connected in coresponding branches of a Wheatstone bridge, the other two branches of the bridge comprising fixed resistances 30 and 31, whereas a temperature difference resistance 32 is arranged to be in series with the thermometer resistance 28 under normal working conditions. A ratcheting device 33 is arranged to be controlled by the Wheatstone bridge through a galvanometer needle 34 acting in conjunction with a clamping device 35 and a commutator 36 all in the manner aforedescribed and is adapted to vary the adjustment of the rheostat 27.

Thus as long as the rate of flow of fluid in the conduit 26 is such as to maintain the Wheatstone bridge in balance no adjustment of rheostat 27 by means of ratcheting mechanism 33 occurs, but upon variation in rate of flow of the fluid such as to cause unbalance of the bridge said rheostat is adjusted automatically to vary the energy input and consequent heating effect of the heater 25 to thereby restore the balance of the bridge, all in a manner more fully disclosed in the Thomas patent aforementioned. A watt hour meter 37, which may be of either the instantaneous or integrated indication type, having energizing coils connected respectively in series with and in shunt to the heater 25 is thereby adapted to indicate the quantitative rate of flow of the fluid in a known manner.

A further watt meter 38 and an integrating watt hour meter 39 are provided for metering the total available heat of the fluid flowing in conduit 26 per unit time, and to such end said metering devices are respectively provided with coils 40 and 41 to be connected across the circuit of heater 25 in parallel to one another through a common variable resistance 42, the value of said resistance in circuit being determinable by the total available heat per unit quantity of the test fluid. For this purpose the slider 18 of the calorimeter may be preferably provided with an insulated extension 43 movable therewith and adapted to so vary the value of the resistance 42 in circuit as to maintain the total value of resistance in the circuit of either coil at all times a function of such heating value, thus subjecting the metering devices last mentioned to influence in accordance with and proportioned to such heating value of the test fluid.

Moreover, since in the present instance the slider together with its extension are adapted to move in accordance with a uniform straight line law, whereas the necessary resistance variation does not follow a straight line law, the resistance 42 is so wound and apportioned with reference to the movement of the slider extension 43 that during such movement the value of said resistance in circuit is varied to maintain such necessary relation. However, it is obvious that if desired said resistance may be so wound and arranged as to vary its value uniformly upon uniform movement of the extension 43, the movement of said extension, or the part corresponding thereto, being varied with reference to the movement of the slider 18 as by a multiplying cam lever or the like whereby the necessary correlation between the movement of said slider and the resultant variation of the resistance 42 in circuit is maintained.

The joint supply circuit of coils 40 and 41 is furthermore, as aforestated, arranged in a shunt relation to the heater 25 of the fluid meter, thereby subjecting the metering devices 38 and 39 to further control as a function of the heat input to the fluid flowing in the conduit 26 whereas said devices are provided with additional coils 44 and 45 connected in series with one another and with said heater 25 as illustrated.

From the foregoing it results that said metering devices which tend as aforementioned to respond to influence of the calorimeter are subjected to further influence by the fluid meter whereby the determinations of said devices comprise the product of such influences, namely, the total available heat of the quantity of fluid flowing in the conduit 26 in unit time.

The means thus far described are constructed and adapted to function substantially in the manner disclosed in the aforementioned Packard patent; whereas the present invention further contemplates the provision of means for automatically maintaining substantially constant the total heating value per unit time of the flow of combustible fluid. Said last-mentioned means as shown may comprise a clamping device indicated generally at 46 and adapted to cooperate with the indicating needle or movable element 47 of watt meter 38, said clamping device having an operating coil 48 adapted to be intermittently energized through operation of the commutator 36, as will be obvious. Thus the needle 47, which has a movement in one direction or the other depending upon the ascertained increase or decrease in the total heating value of the fluid flowing in conduit 26 per unit time, is adapted to function through its clamping device 46 to complete the energizing circuit of one or the other of a pair of electromagnetically operable reversing switches 49 and 50. Switches 49 and 50 are each adapted when closed to provide an energizing circuit for a motor 51 for operation of the latter in reverse directions respectively. Motor 51 when operated is adapted through suitable gearing or other connection, designated generally by the numeral 52, to effect raising or lowering movement of a threaded member 53. Interposed between the lower end of member 53 and the upper end of a rod 54 is a spring 55 the tension of which is normally adjusted through the operation of motor 51 in the manner aforedescribed.

Pistons or blocks 56 and 57 are attached at spaced points to the rod 54 intermediate the ends thereof and are adapted to slide within a cylinder 58,—a pipe 59 being adapted to establish communication between cylinder 58, at a point intermediate the pistons 56 and 57, and the outlet end of an oil pump 60, the inlet end of said pump being adapted to communicate, through pipe 61 and branch pipes 62 and 63, with the upper and lower ends of said cylinder. Cylinder 58 also communicates, by means of pipes 64 and 65, with the upper and lower ends of a cylinder 66 in which a piston 67 is adapted to slide. Attached to piston 67 is a rod 68 having a suitable connection, as indicated at 69, with a valve 70 for controlling the rate of flow of fluid in conduit 26.

An orifice plate 71 is located in conduit 26 at the right-hand side of valve 70, whereas pipes 72 and 73 lead from opposite sides of the orifice plate into the interior of a pair of balanced differential pressure floats 74 and 75, respectively, which are sealed by means of a body of liquid in receptacle 76. As shown, said pressure floats are connected to each other by means of a pivoted crossarm 77, whereas one of said floats (74 in the illustration) is also connected with a downwardly extending portion 78 of rod 54. Pump 60 is adapted to be constantly driven, as by means of the shaft connection 79 with motor 9.

Thus, assuming adjustment of valve 70 by the means aforedescribed to provide a flow of fluid having a given total heating value, such adjustment will be maintained pending variation in the total heating value of the fluid, as will be obvious. However, upon variation in the total heating value per unit volume of the fluid, as determined by the action of the calorimeter, the means aforedescribed will function to effect operation of motor 51 in one direction or the other to increase or decrease the tension on spring 55, whereupon the pistons 56 and 57 are moved to a position to subject one side or the other of piston 67 to the pressure of the oil system to thereby effect movement of the valve 70 to the required degree. Any excess movement of valve 70 is thereafter compensated for by automatic reversal of motor 51 and coincident reversal of the elements controlled thereby. The meter likewise acts in an obvious manner in conjunction with the other elements described to effect movement of valve 70 to compensate for variations in the rate of flow of fluid in conduit 26.

However, the means aforedescribed for effecting adjustment of valve 70 are relatively slow-acting whereas in practice it is found that the rate of flow or pressure of fluid in conduit 26 is subject to sudden and rather wide variations, due to sudden changes in stack draft or the like. Thus the aforementioned pressure floats 74 and 75 act substantially instantaneously in response to changes in relative pressures on the opposite sides of orifice plate 71 to effect movement of blocks 56 and 57, whereby valve 70 is regulated to restore the predetermined pressure drop across the orifice plate 71. The tension of the spring 55 with respect to the pressure floats 74 and 75 will then be slowly but accurately adjusted automatically in response to the slower changes of quality, barometric pressure, temperature, etc., as determined conjointly by the meter and calorimeter, and relayed by the total heat metering elements 38 and 39 in impulses to effect adjustment of the tension of spring 55 by motor 51.

Otherwise stated, the calorimeter and meter are adapted to function conjointly in the manner aforedescribed to maintain valve 70 in a given position pending variation in the total heating value per unit quantity of the flowing fluid or in the rate of flow thereof, whereas the effects of such variations are relayed through control of motor 51 and the instrumentalities associated therewith to cause opening or closing movement of valve 70, whereby the total heating value per unit time of the fluid flowing in conduit 26 is maintained substantially constant. However, a meter of the type disclosed inherently acts rather slowly in relaying the effects of variation in the rate of flow of the fluid. On the other hand, the pressure responsive means aforedescribed acts substantially instantaneously to compensate for variations in rate of flow of the fluid, which would otherwise tend to vary the total heating value of the flow of fluid per unit time. Thus assuming adjustment of valve 70 to provide a flow of substantially constant total heating value, any variation in the relative pressures on opposite sides of orifice plate 70 (due to variations in basic pressure of the fluid to the right of said plate, or to variations in stack draft to the left of said plate) will immediately cause relative movement of the pressure floats 74 and 75, which in turn causes upward or downward movement of blocks 56 and 57, thus controlling the oil pressure system to effect the required movement of piston 67 and valve 70 connected therewith. By this means the rate of flow of fluid is more rapidly and consequently more accurately controlled to insure maintenance of the total heating value thereof per unit time substantially constant.

Where extreme accuracy in the control of the total heating value of the flow of combustible fluid is not required, satisfactory results may be obtained with all parts of the so-called Thomas meter omitted. The pressure responsive means will then act as aforedescribed to control the movement of valve 70, thereby tending to maintain the rate of flow of fluid substantially constant, whereas the effect of said pressure responsive means will be modified in accordance with the determinations of the calorimeter to so vary the rate of flow as to maintain the total heating value of said flow substantially constant, as will be obvious.

What I claim as new and desire to secure by Letters Patent is:

1. In apparatus for maintaining of substantially constant value the total available heat of a flow of fluid, the combination with a conduit, of an adjustable valve for controlling the rate of flow of fluid therethrough, and means for effecting automatic adjustment of said valve, said means including a calorimeter and an electric fluid meter and being adapted to operate as a function of both the total heat per unit quantity of the fluid and the quantitative rate of flow thereof, and said means being also adapted to compensate for variations in temperature, pressure and saturation conditions of said fluid.

2. In a total heat controller, the combination with a conduit through which a combustible fluid is adapted to flow, of a valve operable to regulate the rate of flow of fluid through said conduit, means for automatically controlling operation of said valve in accordance with variations in rate of flow of said fluid, thereby tending to maintain said rate of flow substantially constant, and means including a calorimeter for additionally subjecting said valve to control in accordance with the total heating value per unit quantity of the flowing fluid to thereby maintain said flow of fluid of substantially constant total heating value, said calorimeter including means to compensate for variations in temperature, pressure and saturation conditions of the fluid.

3. In a total heat controller, the combination with a conduit through which a combustible fluid is adapted to flow, of means for producing a pressure drop of the fluid in said conduit, a valve for regulating the rate of flow of fluid through said conduit, means sensitive to variations in value of said pressure drop to effect movement of said valve, thereby tending to maintain the rate of flow of said fluid substantially constant, means comprising a calorimeter for ascertaining the total heating value per unit quantity of said fluid, said calorimeter including means to compensate for variations in temperature, pressure and saturation conditions of the fluid, and means for further subjecting said valve to control in accordance with the value so ascertained to thereby maintain said flow of fluid of substantially constant total heating value.

4. In apparatus for maintaining of substantially constant value the total available heat of a flow of fluid, the combination with a conduit, of an adjustable valve for regulating the rate of flow of fluid therethrough, means for effecting automatic adjustment of said valve, said means including means adapted to function in response to variations in the total heating value per unit quantity of the fluid and in the quantitative rate of flow thereof, said last mentioned means including means to compensate for variations in temperature, pressure and saturation of the fluid and including means rendering unnecessary division of the stream of fluid for ascertaining its quantitative rate of flow.

5. The combination with means for continuously ascertaining instantaneous values of the rate of flow of a fluid independently of variations in temperature, pressure and saturation condition thereof, of distinct means for continuously ascertaining instantaneous values of the total available heat per unit quantity of the flowing fluid, means for combining corresponding instantaneous values so obtained, and means subjected to control by said last mentioned means to automatically vary the rate of flow of said fluid whereby said flow of fluid is maintained of substantially constant total heating value.

6. In apparatus for maintaining of substantially constant value the total available heat of a flow of combustible fluid, the combination with a meter for determining the quantitative rate of flow of the fluid independent of variations in temperature, pressure or saturation condition thereof, of means for automatically and continuously integrating with the determinations of said meter a factor proportional to the instantaneous values of the total available heat per unit quantity of the fluid, and means for automatically varying the rate of flow of said fluid in accordance with variations in value of the integrated determinations so effected.

7. In a total heat controller, the combination with a conduit, of an adjustable valve for varying the rate of flow of combustible fluid therethrough, a meter for determining the quantitative rate of flow of the fluid independent of variations in temperature, pressure or saturation condition thereof, means for automatically and continuously integrating with the determinations of said meter a factor proportional to the instantaneous values of the total available heat per unit quantity of the fluid, means for automatically adjusting said valve in accordance with variations in value of the integrated determinations so effected, and associated means acting substantially instantaneously to effect temporary adjustment of said valve to compensate for sudden variations in the rate of flow of said fluid due to changes in pressure or stack draft.

8. In a total heat controller, the combination with a calorimeter having an element adapted to move in accordance with variations in total heating value per unit quantity of a flowing fluid, an integrating device having an actuating element subjected to control in accordance with the quantitative rate of flow of the fluid and substantially independent of variations in temperature, pressure or saturation condition of the fluid, means subjecting said actuating element to further control by said first mentioned element, and means operable in accordance with variations in the values determined by said integrating device for varying the quantitative rate of flow of said fluid to thereby maintain the same of substantially constant total heating value.

9. In a total heat controller, the combination with a conduit, of an adjustable valve for regulating the rate of flow of fluid therethrough, electrical means for effecting automatic adjustment of said valve, and electro-responsive means for controlling the operation of said electrical means, said electro-responsive means being subjected simultaneously to operating influences variable in accordance with variations in the instantaneous value of total heat per unit quantity of the fluid and in the quantitative rate of flow thereof, to thereby maintain said fluid flow of substantially constant total heating value.

10. In a total heat controller, the combination with a conduit, of a resistance heater to be located in the conduit for imparting heat to a combustible fluid flowing therethrough, resistance thermometers to be subjected respectively to the temperature of the flowing fluid before and after heating by said heater, means for controlling the energy input to said heater to thereby maintain a constant value of the temperature difference of said thermometers, of a movable member having an actuating coil subjected to energization variable in value as a function of the energy input to said heater, means subjecting said coil to further energization control in accordance with the heating value per unit quantity of the flowing fluid, and means operable in accordance with the direction and degree of movement of said movable member for varying the quantitative rate of flow of said fluid to thereby maintain the same of substantially constant total heating value.

11. In a total heat controller, the combination with a conduit, of an adjustable valve for varying the quantitative rate of flow of fluid therethrough, electrical means for determining the quantitative rate of flow of said fluid, a calorimeter including electrical means for determining the total heating value per unit quantity of said fluid, electrical means for integrating the values of the determinations so effected to provide for determination of the instantaneous total heating value of said flow of fluid, and means responsive to variations in said instantaneous value from a predetermined value for effecting automatic adjustment of said valve, to thereby maintain said flow of fluid of substantially constant total heating value.

12. In a total heat controller, the combination with a conduit, of an adjustable valve for varying the rate of flow of fluid therethrough, a meter including electrical means for determining the quantitative rate of flow of said fluid, a fluid combustion calorimeter including electrical means for determining the total heating value per unit quantity of said fluid, electrical means for integrating the values of the determinations so effected to provide for determination of the instantaneous total heating value of said flow of fluid, and means responsive to variations in said instantaneous value from a predetermined value for effecting automatic adjustment of said valve to thereby maintain said flow of fluid of substantially constant total heating value, said last mentioned means comprising a reversible motor and fluid pressure means controlled thereby and operatively connected with said valve.

13. In a total heat controller, the combination with a conduit, of an adjustable valve for varying the rate of flow of fluid therethrough, a meter including electrical means for determining the quantitative rate of flow of said fluid, a fluid combustion calorimeter including electrical means for determining the total heating value per unit quantity of said fluid, electrical means for integrating the values of the determinations so effected to provide for determination of the instantaneous total heating value of said flow of fluid, means responsive to variations in said instantaneous value from a predetermined value for effecting automatic adjustment of said valve to thereby maintain said flow of fluid of substantially constant total heating value, said last mentioned means comprising a reversible motor and fluid pressure means controlled thereby and operatively connected with said valve, and auxiliary control means for said fluid pressure means, said former means comprising an orifice in said conduit and differential pressure floats adapted to be subjected to pressure conditions on opposite sides of said orifice to thereby effect substantially instantaneous adjustment of said valve to compensate for sudden changes in the rate of flow of said fluid.

14. In apparatus for maintaining of substantially constant value the total available heat of a flow of fluid, the combination with a resistance heater to be located in the fluid conduit for imparting heat to the flowing fluid, of resistance thermometers to be subjected respectively to the temperature of the flowing fluid before and after heating by said heater, means for controlling the energy input to said heater to thereby maintain a constant value of the temperature difference of said thermometers, a calorimeter comprising a burner, means to supply thereto in definite proportions test fluid and cooling fluid, the latter to absorb the heat of combustion of the test fluid, means comprising resistance thermometers adapted to ascertain the instantaneous values of the resultant temperature rise of the cooling fluid, electroresponsive means subjected jointly to control in accordance with variations in said temperature rise and in accordance with variations in the value of energy input to said heater, electrical means controlled by said electroresponsive means, and a valve controlled by said electrical means for automatically varying the rate of flow of said fluid to thereby maintain a substantially constant total heating value of the latter.

15. In apparatus for maintaining of substantially constant value the total available heat of a flow of fluid, the combination with a resistance heater to be located in the fluid conduit for imparting heat to the flowing fluid, of resistance thermometers to be subjected respectively to the temperature of the flowing fluid before and after heating thereof by said heater, means for controlling the energy input to said heater to thereby maintain a constant value of the temperature difference of said thermometers, a fluid combustion calorimeter, means to supply thereto in definite proportions test fluid and cooling fluid, the latter to absorb the heat of combustion of the test fluid, means comprising resistance thermometers adapted to ascertain the instantaneous values of the resultant temperature rise of the cooling fluid, electro-responsive means subjected simultaneously to control in accordance with variations in said temperature rise and in accordance with variations in the value of energy input to said heater to thereby effect continuous determination of the instantaneous total heating value of said flow of fluid, a member movable by said electroresponsive means in a direction and to a degree corresponding with variations of said instantaneous total heating value from a predetermined value, electrical means controlled by said movable member, fluid pressure means controlled by said electrical means, and a valve controlled by said fluid pressure means for automatically varying the rate of flow of said fluid to maintain the same of substantially constant total heating value.

16. In apparatus for maintaining of substantially constant value the total available heat of a flow of fluid, the combination with a resistance heater to be located in the fluid conduit for imparting heat to the flowing fluid, of resistance thermometers to be subjected respectively to the temperature of the flowing fluid before and after heating thereof by said heater, means for controlling the energy input to said heater to thereby maintain a constant value of the temperature difference of said thermometers, a fluid combustion calorimeter, means to supply thereto in definite proportions test fluid and cooling fluid, the latter to absorb the heat of combustion of the test fluid, means comprising resistance thermometers adapted to ascertain the instantaneous values of the resultant temperature rise of the cooling fluid, electro-responsive means subjected simultaneously to control in accordance with variations in said temperature rise and in accordance with variations in the value of energy input to said heater to thereby effect continuous determination of the instantaneous total heating value of said flow of fluid, a member movable by said electroresponsive means in a direction and to a degree corresponding with variations of said instantaneous total heating value from a predetermined value, electrical means controlled by said movable member, fluid pressure means controlled by said electrical means, a valve controlled by said fluid pressure means for automatically varying the rate of flow of said fluid to maintain the same of substantially constant total heating value, and auxiliary control means for said fluid pressure means, said means comprising an orifice in the fluid conduit and a pair of balanced pressure floats subjected respectively to pressures on opposite sides of said orifice, to thereby effect substantially instantaneous adjustment of said valve to compensate for sudden variations in the rate of flow of the fluid due to changes in pressure or stack draft.

In witness whereof, I have hereunto subscribed my name.

CLARENCE S. PINKERTON.